(12) United States Patent
Grinbaum et al.

(10) Patent No.: US 7,452,520 B2
(45) Date of Patent: Nov. 18, 2008

(54) PROCESS FOR THE PRODUCTION OF CALCIUM BROMIDE BY LIQUID-LIQUID EXTRACTION

(75) Inventors: Baruch Grinbaum, Kiriat Tivon (IL); Leni Kogan, Kiriat Haim (IL); Eli Barnea, Haifa (IL); Gideon Harel, Kiriat Tivon (IL); Rafael Semiat, Haifa (IL); Samuel Wahrmann, Haifa (IL)

(73) Assignee: Bromine Compounds Limited (IL)

( * ) Notice: Subject to any disclaimer, the term of this patent is extended or adjusted under 35 U.S.C. 154(b) by 959 days.

(21) Appl. No.: 10/469,015

(22) PCT Filed: Feb. 21, 2002

(86) PCT No.: PCT/IL02/00141

§ 371 (c)(1),
(2), (4) Date: Mar. 8, 2004

(87) PCT Pub. No.: WO02/068330

PCT Pub. Date: Sep. 6, 2002

(65) Prior Publication Data

US 2004/0131535 A1 Jul. 8, 2004

(30) Foreign Application Priority Data

Feb. 26, 2001 (IL) .................... 141661

(51) Int. Cl.
*C01F 11/20* (2006.01)
*C01F 11/34* (2006.01)
(52) U.S. Cl. .................... 423/497; 423/157
(58) Field of Classification Search ............ 423/497, 423/157
See application file for complete search history.

(56) References Cited

U.S. PATENT DOCUMENTS

| 2,900,223 A | 8/1959 | Cunningham |
| 3,389,970 A | 6/1968 | Scheibek |
| 3,449,088 A | 6/1969 | Lee |
| 3,489,526 A | 1/1970 | El-Roy et al. |

(Continued)

OTHER PUBLICATIONS

Kirk-Othmer Encyclopedia of Chemical Technology, Internet version, vol. 10, "Extraction, Liquid-Liquid", pp. 756-781, http://www.mrw.interscience.wiley.com/emrw/9780471238966/kirk/article/liqulo.a01/rel0001/pdf.*

(Continued)

*Primary Examiner*—Ngoc-Yen M Nguyen
(74) *Attorney, Agent, or Firm*—Lerner, David, Littenberg, Krumholz & Mentlik, LLP

(57) ABSTRACT

A process for the production of calcium bromide from feed brines, particularly from Dead Sea End Brine (EB), is described. The process comprises extracting the feed brine in countercurrent with a composite organic solvent; optionally, purifying the extract to increase the ratio Br:Cl by contacting it with a part of the product; and washing the purified extract with water to yield the product, that is an aqueous solution of $CaBr_2$. The composite solvent comprises an anionic extractant, such as an amine or a mixture of amines; a cationic extractant, such as a carboxylic phosphoric or sulphonic acid or a mixtures of said acids; and diluent/modifier, which is an organic solvent. An apparatus for the production of calcium bromide is also described, which comprises: an extraction battery; optionally, a purification battery; and a washing battery, wherein at least one of the batteries comprises a plurality of stages.

16 Claims, 4 Drawing Sheets

U.S. PATENT DOCUMENTS

| | | | |
|---|---|---|---|
| 3,490,880 A * | 1/1970 | Charlesworth | 423/157 |
| 3,563,389 A | 2/1971 | Mizrahi | |
| 3,649,219 A | 3/1972 | Lynn et al. | |
| 3,973,759 A | 8/1976 | Mizrahi et al. | |
| 4,151,077 A * | 4/1979 | Nogueira et al. | 210/638 |
| 5,078,751 A * | 1/1992 | Mizrahi et al. | 44/448 |
| 7,087,209 B2 * | 8/2006 | Symens et al. | 423/491 |

OTHER PUBLICATIONS

Grinbaum, B. "Formation of stable droplets in a mixer-settler battery" Database Caplus, 1995.

Hanson, et al., "Extraction of Magnesium Chloride From Brines Using Mixed Ionic Extractants", Journal Of Nuclear And Inorganic Chemistry, vol. 37, pp. 191-198, Feb. 14, 1974.

Hanson et al., "Recovery Of Magnesium Chloride From Sea Water Concentrates", Proceeding International Solvent Extraction Conference, vol. 1, pp. 779-791, 1974.

Grinstead, et al., "Extraction By Phase Separation With Mixed Ionic Solvents", Ind. Eng. Chem. Prod. Res. Development, vol. 9, No. 1, Mar. 1970.

Godfrey et al., Liquid-Liquid Extraction Equipment, pp. 227-245.

Karr et al., "Scaleup Of Large Diameter Reciprocating-Plate Extraction Columns", Chem. Eng. Prog., vol. 72, No. 68, pp. 68-70, Nov. 1976.

* cited by examiner

PROCESS FOR THE PRODUCTION OF CALCIUM BROMIDE BY LIQUID-LIQUID EXTRACTION

FIELD OF THE INVENTION

This invention relates to a process and apparatus for the production of $CaBr_2$—calcium bromide—solutions from brines which contain it, particularly from Dead Sea end brine (hereinafter indicated by EB).

BACKGROUND OF THE INVENTION

The term "brine" means herein a concentrated saline solution of sodium chloride and other salts. Concentrated solution that do not contain sodium chloride are not called herein "brines", although they are so called at times in the literature. The Dead Sea End Brine hereinafter briefly indicated by "EB") is the brine that remains after the final concentration stage in the process for the production of carnallite from Dead Sea waters. It contains 20-27 wt % $Cl^-$, 0.75-0.95 wt % $Br^-$, 2-5 wt % $Ca^{++}$ and 5-7 wt % $Mg^{++}$. Any solution of the above salts, having salts concentration substantially within the above limits, is a brine comprised in this application, regardless of its origin, and what is said hereinafter about EB should be understood as applying to any solution having salts concentration substantially within the above limits. Calcium bromide solutions, having concentrations e.g. close to 50 wt %, are used as clear drilling fluids and optionally may be used as bromine carriers. $CaBr_2$ is presently prepared by direct reaction of liquid solution of HBr with $Ca(OH)_2$ (lime) or $CaCO_3$, followed by filtration and concentration. This process, however, is expensive, particularly because hydrobromic acid must be made from bromine, which is produced from the same EB by stripping with chlorine.

It would be desirable to avoid these chemical processes and to recover calcium bromide directly from brines which contain it, and this is one of the purposes of this invention.

Extraction processes are known in the art. Robert R. Grinstead et al. describe the recovery of magnesium chloride from sea water concentrates in the article "Extraction by Phase Separation with Mixed Ionic Solvents" in Ind. Eng. Chem. Prod. Res. Develop., 9, No. 1, March 1970. This article describes how magnesium chloride is reversibly extracted from an aqueous feed brine, which is a sea water concentrate, by an organic phase, and is subsequently stripped from the organic phase by contact with water to produce a magnesium chloride solution. The organic phase used was a solution of a quaternary amine (Aliquat 336) and naphthenic acid or of a primary amine (Primene JMT) and naphthenic acid, in toluene. Although calcium is present in sea water, little calcium ion is normally found in solution in said concentrates, because of the substantial sulfate concentration, and accordingly, it was not considered in the said article. The separation considered was mainly of $MgCl_2$ from NaCl.

The equipment described by Grinstead et al. consists of an extractor having a number of stages and a stripper having another number of stages. The feed brine is loaded into the extractor, the loaded organic phase is loaded into the stripper. Water is fed to the stripper, from which a product brine is obtained. The organic phase, stripped in the stripper, is returned to the extractor. The final product solution is obtained from the stripper.

C. Hanson et al., in Proceedings International Solvent Extraction Conference 1974, Vol. 1, p. 779-790, have described a process for the recovery of magnesium chloride from sea water concentrates using a mixed ionic extractant.

Several systems of ionic extractants have been studied by the authors, and the best results are said to be obtained with an equimolar mixture of Aliquat-336 and Acid-810. Aliquat-336 is a mixture of quaternary alkyl ammonium chlorides and Acid-810 is essentially a mixture of isooctanoic, isononanoic and isodecanoic acids. Toluene was found to be a satisfactory diluent.

C. Hanson et al., in "Extraction of Magnesium Chloride from Brines Using Mixed Ionic Extractants", J. Inorg. Nucl. Chem. 1975, Vol. 37, p. 191-198, describe the use of organic extractants, using as amines Alamine-336 (mixture of tertiary amines), Aliquat-336 (mixture of quaternary amines), Amberlite LA-2 (mixture of secondary amines) and Primene JM-T (mixture of isomeric primary amines), and using carboxylic acids as Acid-810, naphthenic acid and Versatic acid 911. The diluent used was toluene.

U.S. Pat. No. 3,649,219 describes a process for extracting inorganic salts from aqueous solutions which comprises contacting the aqueous solution with an extractant liquid, which comprises an acid member and a base member, which is an amine, separating the resulting inorganic-salt-containing extractant liquid from the inorganic salt depleted aqueous phase, and stripping the inorganic salt from the extractant liquid by water.

The prior art deals mainly with separation of $MgCl_2$ from NaCl. The data about the extraction of calcium salts are limited and include mainly chlorides. There are no data on the separation of two salts of divalent metals. This invention applies to an even more complicated system, dealing with the separation of four salts of divalent metals: $CaBr_2$, $CaCl_2$, $MgBr_2$ and $MgCl_2$. Furthermore, the references actually describe laboratory experiments and not an industrially valid process, and do not take into consideration the problems which arise in industrial operation.

It is therefore a purpose of this invention to provide an industrial process for producing calcium bromide by extraction from brines that contain it, particularly Dead Sea End Brine.

It is a further purpose of this invention to provide such a process which permits to extract calcium bromide in high yields.

It is a still further purpose of this invention to solve the various problems which are encountered in the extraction of calcium bromide from EB and other brines, which will be specifically detailed hereinafter.

Other purposes and advantages of the invention will appear as the description proceeds.

SUMMARY OF THE INVENTION

The feed brine considered hereinafter is EB, which contains 20-27 wt % $Cl^-$, 0.75-0.95 wt % $Br^-$, 2-5 wt % $Ca^{++}$ and 5-7 wt % $Mg^{++}$. However, as said hereinbefore, the invention applies to other feed brines: of similar composition, no matter what their origin The process of the invention comprises:

1) extracting a feed brine in countercurrent or crosscurrent with a composite organic solvent;

2) optionally, purifying the extract to increase the ratio Br:Cl by contacting it with a part of the product;

3) washing the optionally purified extract with water, preferably distilled water, to yield the product that is an aqueous solution of $CaBr_2$; and 4) optionally, concentrating the product solution to the desired concentration, not higher than 65 wt %, e.g. 52 wt %.

The feed of the said process typically has a Br/Cl weight ratio from about 1/20 to about 1/40. The product obtained from said process typically has a Br/Cl weight ratio from about 1:1 to about 1:3, if the optional purifying step has not been carried out, and from 10/1 to 120/1 if it has been carried out.

The aforesaid extraction, purification and washing operations are preferably carried out in a number of stages.

The composite solvent includes:

an Anionic Extractant: a primary, secondary, tertiary or quaternary amine with long, straight or branched, aliphatic chains, preferably C8-C12, or a mixture of said amines;

a Cationic Extractant: a carboxylic acid or alkyl- or aryl-phosphoric acid, or alkyl- or aryl-sulphonic acid, with long aliphatic chain, preferably C8-C12, either straight or branched, or a mixture of said acids.

a Diluent/Modifier: an aromatic solvent, with short aliphatic chain, preferably C1-C3, e.g., toluene, xylene, anisole, ethylbenzene, etc, or a nitro- or halo-aromatic solvent, such as chlorobenzene, nitrotoluene, or a cycloaliphatic solvent, such as cyclohexane, or an ether or a substituted aniline.

The composite solvent preferably contains each of the anionic and cationic extractants in molar concentrations in the range of 0.4-0.9 M (moles per liter), the molar concentrations of said anionic and cationic extractants differing from one another by not more than 0.15 M and preferably being equal.

The composite organic solvent used in the extraction stage is preferably refluxed solvent, viz. that resulting from washing the purified extract with water (hereinafter, "the washed solvent"). It contains small amounts of bromide, e.g. 200-300 ppm.

The brine resulting from the purification of the extract to increase the ratio Br:Cl (hereinafter, "the depleted reflux") is preferably refluxed, viz. added to the feed brine and fed with it to the extraction stage.

The product solution typically contains 15-35 wt % of $CaBr_2$.

The brine issuing from the extraction stage. (hereinafter, "the depleted brine") is discharged.

The maximum molar loading of the solvent after the extraction by it of the feed brine can be equal to the molar concentration of its active components (0.4-0.9 M). The percent loading is the ratio between the moles per liter (M) of salt extracted and the maximum moles per liter that could be extracted (which is equal to the molar concentration of the active components of the solvent).

The percent loading of the solvent ranges from about 30% in the winter to 70% in the summer on a molar base. The EB composition changes from winter to summer: e.g. the Br wt % may rise from 0.8 to 0.9 and the Cl wt % may rise from 23.4 to 26.2. The loading is higher when the temperature is lower and when the ionic strength is higher. The loading is a very steep function of temperature and ionic strength.

The apparatus according to the invention comprises: a) an extraction battery; b) optionally, a purification battery; and c) a washing battery. All the batteries are preferably multistage. The process can be carried out in various types of equipment. A demonstration plant was run in series of mixer-settlers. In such a plant, each stage comprises a mixer in which the organic and aqueous phases are mixed and a settler in which they are separated. In later experiments, the process was run in a pilot scale pulsed column, where each battery was run in one column. The column was high enough to yield the requested number of theoretical stages for each battery. The process can be carried out in other types of columns e.g. packed columns, Scheibel or Karr columns, just as well.

The yield, calculated as $CaBr_2$, viz. the ratio between the amount of calcium bromide in the product solution to the amount thereof in the feed brine, is between 20 and 70 wt %. It can be increased by increasing the number of stages in the various batteries and increasing the ratio of the organic phase to the feed.

DETAILED DESCRIPTION OF PREFERRED EMBODIMENTS

Figure 1:
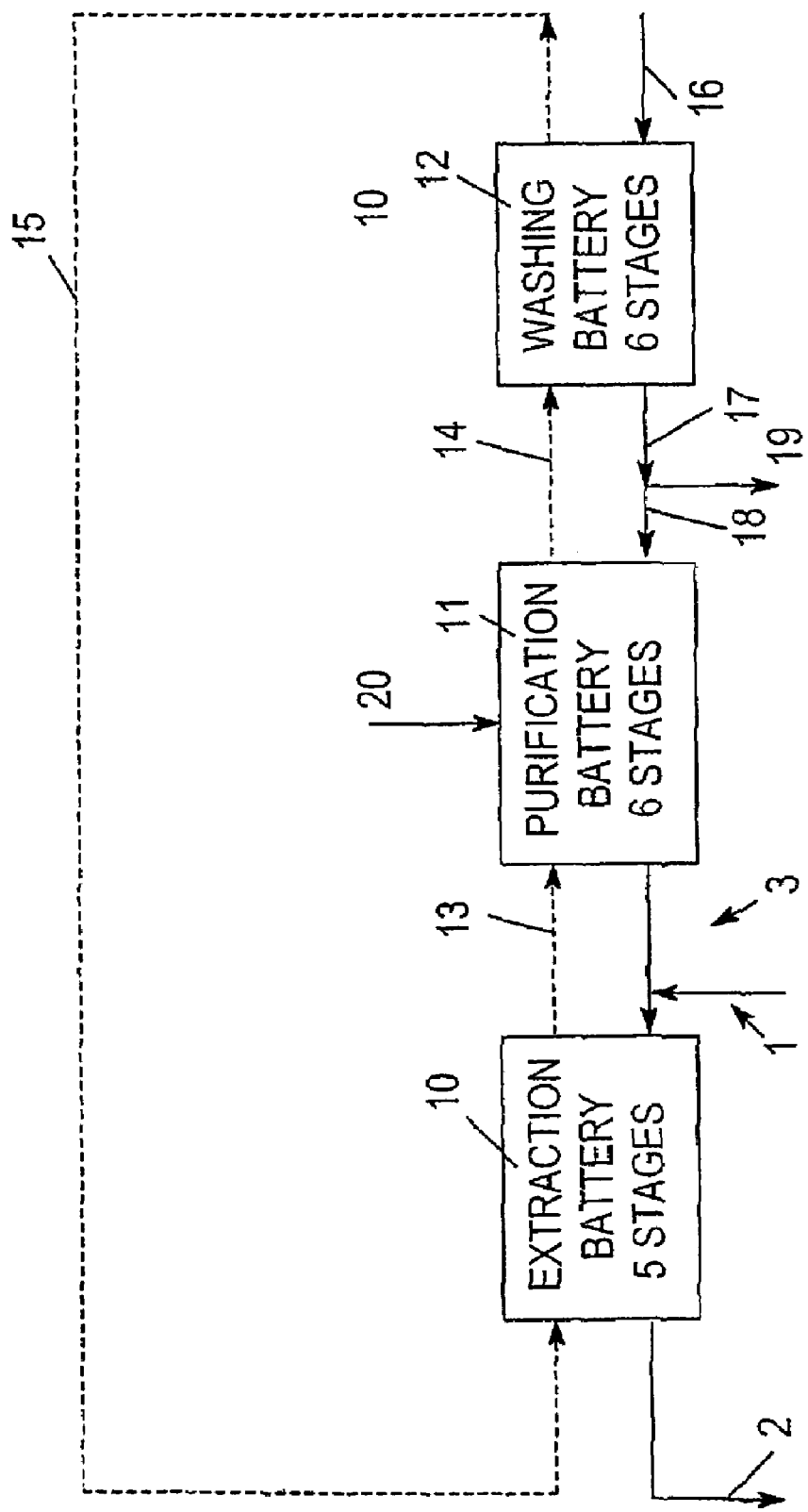
FIG. 1 is a flowsheet of a process according to an embodiment of the invention.

The process of the invention is preferably a continuous process, in which the organic and aqueous phases are fed countercurrent to one another. Thus (see FIG. 2), the upper organic phase from the n-th settler, is fed to the "n+1" mixer, while the lower aqueous phase from the n-th settler is fed to the "n−1" mixer. The organic phase is a closed circuit all over the plant. Some aqueous phases are introduced or withdrawn at different stages, as described in the process flowsheet (FIG. 1). The extraction battery comprises, e.g., of 5 mixer-settlers; the purification battery comprises, e.g., 6 mixers-settlers, and the washing battery also comprises, e.g., 6 mixers-settlers. The height of a 40 mm pulsed column for each battery is from 5 to 10 meters.

A pilot plant was erected according to a preferred embodiment of the invention, which produce, at steady state, 2100 tons/year of $CaBr_2$ 52 wt %. In said plant, the mixer is a tank of 1250 mm diameter and 1400 mm height, agitated by a blade turbine. The aqueous and organic flows (streams) enter at the bottom of the mixers by way of separate channels, are pumped to the agitator housing, and are cast forward, generally perpendicularly.

The settler is a tank with a diameter of 2500 mm and an active height of 1800 mm. The flows enter the settler from the mixer by way of a rectangular channel to the annulus located in the center of the settler. The annulus is composed of a set of grooves (slits) which creates a horizontal distribution of the mixture. The separation region in the settler is composed of 12 units of stream distributors. The calming region is built from horizontal leaves through which the mixture passes and is separated. At the upper edge of the settler, there is a channel for the perimetric collection, with an exit opening of 8 inches to the next mixer. At the bottom of the settler, there is a directing system by way of a variable leg, which determines the aqueous phase height in the settler.

The material of the construction of the mixers and the settlers is F.R.P. Cristic 600 PA or similar.

Mixer-Settlers that can be used to carry out the invention are known in the art and are described for instance in U.S. Pat. No. 3,489,526. Compact settlers that can be used to carry out the invention are known in the art and are described for instance in U.S. Pat. No. 3,563,389. Turbine mixers that can be used to carry out the invention are known in the art and are described for instance in U.S. Pat. No. 3,973,759.

At least four different types of columns, that can be used to carry out the invention, are known in the art: packed columns, described for instance in G. Stevens in J C Godfrey and M. Slater "Liquid-liquid Extraction Equipment, BPC (Bateman Pulsed Column), Karr reciprocating column, described for instance in A E Karr and T C Lo, Chem. Eng. Prog. 72, 68 (1976) and Scheibel agitated column, described for instance in U.S. Pat. No. 3,389,970.

The process of the invention comprises the extraction of the feed, typically EB, by a composite solvent, which includes an anionic extractant, a cationic extractant and a diluent, which serves also as a modifier.

As set forth hereinbefore, the process may be carried out in any composite solvent which contains the following components:

Anionic Extractant: a primary, secondary, tertiary or quaternary amine with long, straight or branched, aliphatic chains, preferably C8-C12, or a mixture of said amines.

Cationic Extractant: a carboxylic or alkyl- or aryl-phosphoric, or alklyl-or aryl-sulphonic acid, with long aliphatic chain, preferably C8-C12, either straight or branched, or a mixture of said acids.

Diluent/Modifier: an aromatic solvent, with short aliphatic chain, preferably C1-C3, e.g., toluene, xylene, anisole, ethylbenzene, etc, or a nitro- or halo-aromatic solvent, such as chlorobenzene, nitrotoluene, or a cycloaliphatic solvent, such as cyclohexane, or an ether or a substituted aniline.

The anionic and cationic extractants should have a similar molar concentration in the solvent mixture, in the range of 0.4-0.9 M, preferably equal molar concentrations or molar concentrations that differ by no more than 0.15 M. A preferred concentration is about 0.8 M. Below 0.4 M, the loading of the solvent dropped below reasonable values, while above 0.9 M, the solvent has a high viscosity that hinders the separation of the organic phase from the aqueous phase.

The selectivities of Br versus Cl, indicated herein as S(Br,Cl), and of Ca versus Mg, indicated herein as S(Ca,Mg), are defined as:

$$S(Br, Cl) = \frac{\frac{\{Br\}org}{\{Br\}aq}}{\frac{\{Cl\}org}{\{Cl\}aq}}$$

viz. the ratio of the ratio of the molar or weight concentration of Br in the organic phase to that in the aqueous phase to the ratio of the molar or weight concentration of Cl in the organic phase to that in the aqueous phase;

$$S(Ca, Mg) = \frac{\frac{\{Ca\}org}{\{Ca\}aq}}{\frac{\{Mg\}org}{\{Mg\}aq}},$$

viz. the ratio of the ratio of the molar or weight concentration of Ca in the organic phase to that in the aqueous phase to the ratio of the molar or weight concentration of Mg in the organic phase to that in the aqueous phase.

The selectivities are not functions of the concentrations, and the loading is roughly linear to the concentration of the extractants. S(Br,Cl) is about 8 to 30, typically 12-18, and S(Ca,Mg) is so high that the extractability of magnesium is negligible for all practical purposes.

The solvent used in the following Examples consisted of:

0.8 M. (about 43 wt %) Alamine 336 (mixture of tridecyl and tridecyl amines).

0.8 M (about 12 wt %) Cekanoic Acid (isodecanoic acid).

About 45 wt % Xylene (mainly mixture of metaxylene and ethylbenzene)

The solvent that comes into actual contact with the feed is a refluxed, washed solvent, that contains small amounts of bromide, as set forth hereinbefore. The aforesaid data refer to the unloaded, original solvent.

FIG. 1 is a flowsheet of a process according to an embodiment of the invention which comprises the purification stages. Numerals 10, 11 and 12 indicate respectively the extraction, purification and washing process stages. Line 13 leads the extract from extraction to purification. Line 14 leads the purified extract from purification to washing. Line 15 indicates the reflux of the washed solvent to extraction. Line 16 indicates the water feed. The product solution is drawn from the washing as indicated at 17, and is divided into a product reflux to purification, as indicated at 18, and a final product solution, drawn from the process as indicated at 19. Using the product as reflux (stream 18), the purification stage yields a purified extract, that has a ratio Br:Cl from 10:1 to 120:1. Said extract has a high concentration of Br$^-$ (above 2 wt %), which leads to high entrainment of the aqueous phase in the organic phase after separation in the last stages of the purification battery. Up to 3 vol % entrainment is obtained, while the maximum allowed to avoid back mixing is. 0.1 vol %.

In order to lower the aforesaid concentration of Br$^-$, the flowsheet of FIG. 1 was modified, in a preferred embodiment of the invention, by the addition of water in an intermediate point of the purification process stage, as indicated at 20 in FIG. 1. It lowered the ionic strength of both the aqueous and the organic phases, and sharply decreased the aqueous phase entrainment, without any harm to the yield or the production rate.

A problem that can arise is constituted by the leakage of solvent from the plant. This leakage is mainly due to the presence of organic solvent in the depleted brine, causes an ecological problem, and leads to loss of solvent. The components of the solvent have different solubilities in the brine and, on the other hand, there is solvent entrainment in the depleted brine, consisting of drops of solvent that did not separate in the settler. The solubilities of the organic component in the brine are as follows: alamine —0.2 ppm; cekanoic—20 ppm. Thus the solvent losses caused by solubility are negligible and cannot be prevented, anyhow.

Factors that contribute to increase the leakage caused by entrainment are:

a) The decrease in the temperature of the brine and of the solvent, which increases the viscosity and decreases the phase separation rate. This phenomenon is particularly important in winter.

b) An increase in the concentration of surface-active agents which accumulate in the solvent also increase the entrainment of solvent in the depleted brine.

c) Accumulation of deposits and gels in the settlers decrease the capability of phase separation.

The leakage problem is solved, in an embodiment of the invention, by physical separation of the solvent entrained in the depleted brine. Physical separation can be effected e.g. by the use of a separator with a filling of particulate material, specifically sand, having a granulometry of 0.8-1 mm. This sand filter, in an embodiment of the invention, had a diameter of 3.2 m. and the sand bed height was 1 m. The flow rate through it was 3-4 m/h and every 24 hours it was countercurrently washed with water at a flow rate of 35-40 m/h for 15-20 min.

Figure 2:
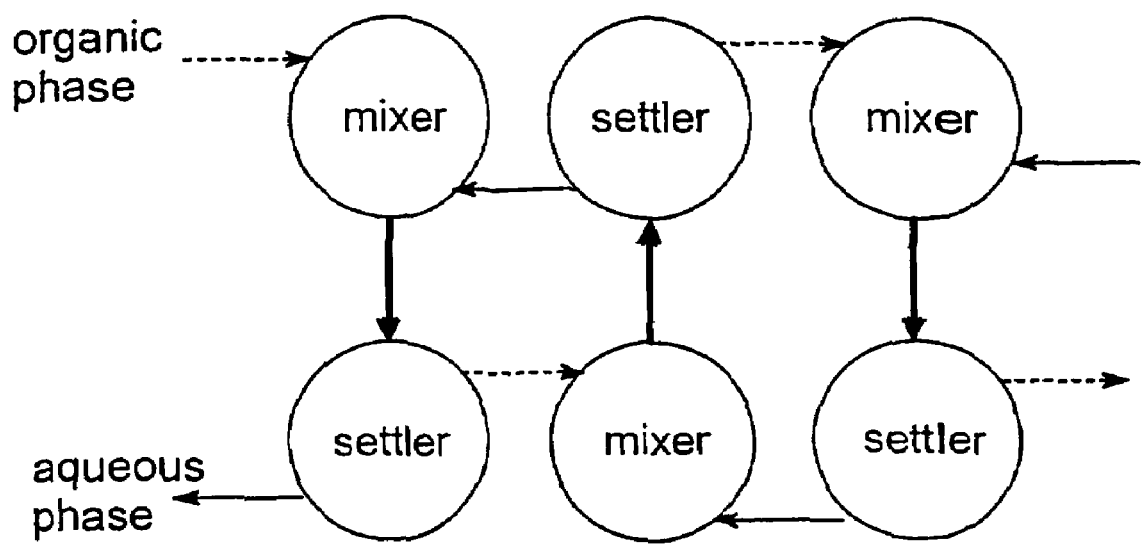
FIG. 2 is a schematic block diagram of a battery of mixers and settlers, part of an apparatus for carrying out said process.

FIG. 2, which is self-explanatory, schematically shows how the aqueous phase (viz., the brine) flows through successive couples of mixers and settlers, while the organic phase (viz., the solvent) flows through the same in countercurrent.

Figure 3:
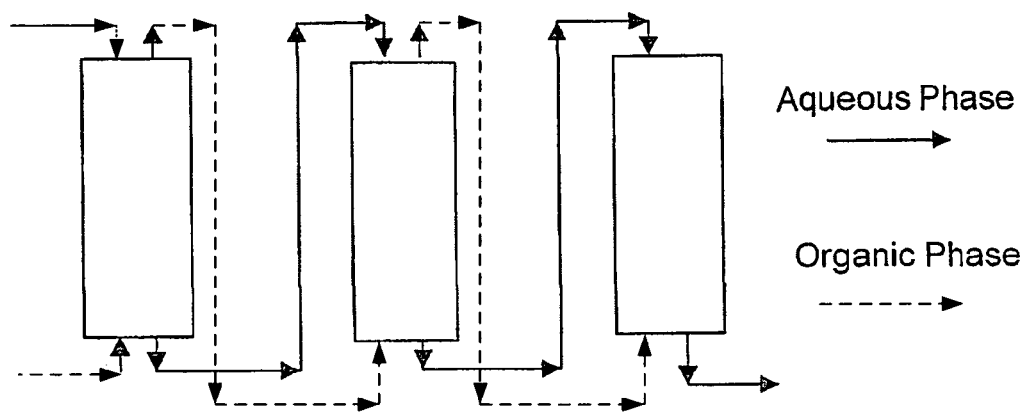
FIG. 3 is a schematic diagram of an apparatus comprising a plurality of batteries.

FIG. 3 schematically illustrates how the aqueous and the organic phase flow successively though several extraction stages, while flowing in countercurrent in each stage.

Figure 4:
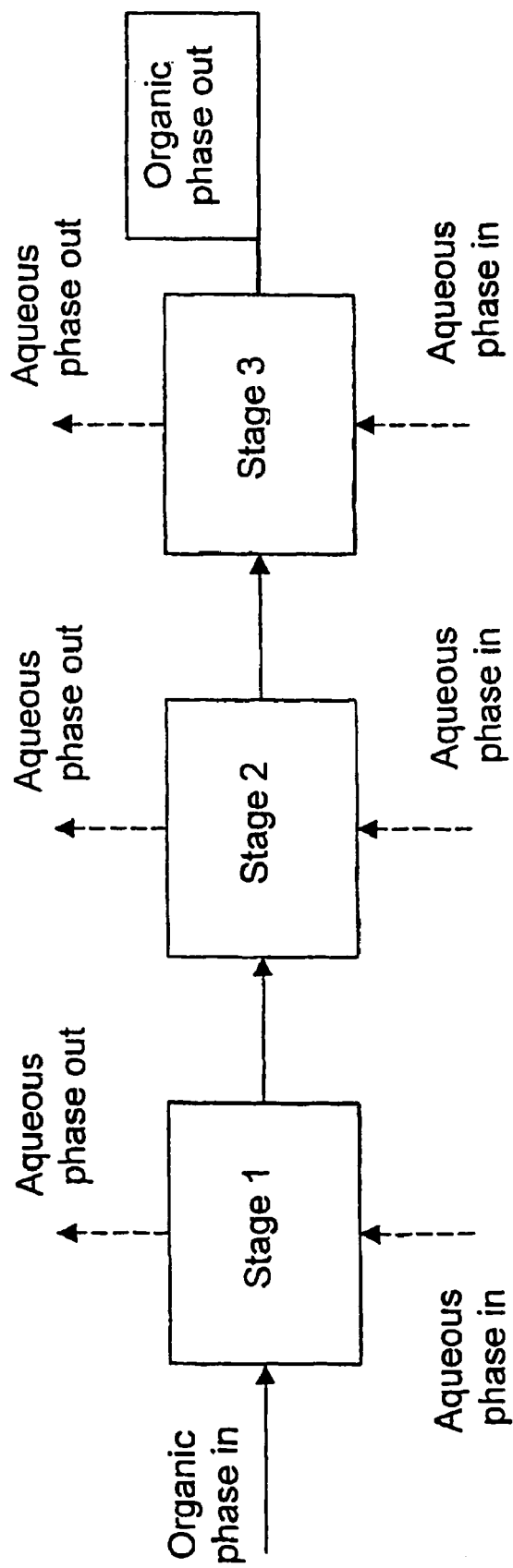
FIG. 4 is a schematic illustration of a crosscurrent apparatus.

FIG. 4 schematically illustrates a crosscurrent apparatus, in which the organic phase flows successively through several stages, and is contacted in each stage with a fresh stream of aqueous phase.

The following examples describe operations that were carried out in the pilot plant hereinbefore described.

Example 1

The following are the representative results of a summer run (August) according to the flowsheet of FIG. 1. The following parameters obtained:
Brine composition: 0.90% Br—, 26.2% Cl—
Flow rates: 43 m³/hr end brine, 85 m³/hr solvent, 3.6 m³/hr wash water.
Production rate: 1110 lt/hr of 18.5% $CaBr_2$ (490 kg of 52% $CaBr_2$, with 0.7% Cl— in the 52% product)
Yield of Br— extraction: 37%
Representative concentrations:
Depleted brine: 0.53% Br—, 24.4% Cl—
Extract: 1.2% Br—, 1.2% Cl—
Washed solvent 0.03% $Br_2$ The percentages, here and hereinafter, are by weight unless otherwise indicated.

| Stream | Stream No. | Flow Rate m³/h | wt % Cl- | wt % Br- |
|---|---|---|---|---|
| E.B. | 1 | 43 | 26.2 | 0.90 |
| W.S. | 15 | 85 | 0 | 0.03 |
| Water to washing | 16 | 3.6 | 0 | 0 |
| R | 18 | 2.3 | 0.25 | 14.2 |
| Water to purification | 20 | 2.2 | 0 | 0 |
| Pr | 19 | 1.11 | 0.25 | 14.2 |
| DB | 2 | — | 24.4 | 0.53 |
| Ex | 13 | — | 1.2 | 1.2 |
| P. Ex | 14 | — | 0.005 | 0.7 |
| DR | 3 | — | 16.7 | 8.6 |

Example 2

Representative results of a winter run (January) from the same plant are given below. The yield of $CaBr_2^-$ extraction was 23 wt %.

| Stream | Stream No. | Flow Rate m³/h | wt % Cl- | wt % Br- |
|---|---|---|---|---|
| E.B. | 1 | 35 | 23.4 | 0.80 |
| W.S. | 15 | 50 | 0 | 0.03 |
| Water to washing | 16 | 2.0 | 0 | 0 |
| R | 18 | 1.8 | 0.25 | 14.3 |
| Water to purification | 20 | 1.2 | 0 | 0 |
| Pr | 19 | 0.38 | 0.25 | 14.3 |
| DB | 2 | — | 22.1 | 0.60 |
| Ex | 13 | — | 1.4 | 0.86 |
| P. Ex | 14 | — | 0.005 | 0.77 |
| DR | 3 | — | 16.8 | 5.2 |

Example 3

This Example refers to a summer run (temperature 50° C.) carried out in a pilot that consists of nine stages of mixer settler, 45 l/hr of Dead Sea EB met, in countercurrent flow, 85 l/hr of washed solvent. The extract was washed with 6 l/hr of distilled water, without any purification. Five stages were used for extraction and four for washing.

The inlet brine contained 26.7 wt % Cl, 0.92 wt % Br and 4.08 wt % $Ca^{++}$ and 6.8 wt % $Mg^{++}$. The product had 5.2 wt % Br⁻ and 17.1 wt % Cl⁻. 85 wt % of the Br⁻ in the feed was extracted.

Example 4

Winter conditions—temperature of 25° C.

The plant and the flow rates are as in Example 3, but the composition of the feed is 24 wt % Cl⁻, 0.84 wt % Br⁻, 3.25 wt % $Ca^{++}$ and 6.8 wt % $Mg^{++}$.

The composition of the product was 5.2 wt % Br⁻ and 15.5 wt % Cl⁻. 92 wt % of the Br⁻ in the feed was extracted.

While embodiments of the invention have been described for the purpose of illustration, it will be apparent that the invention can be carried into practice with many modifications, variations and adaptations, without departing from its spirit or exceeding the scope of the claims.

The invention claimed is:

1. A process for the production of a calcium bromide solution comprising the steps of:
    a) extracting a feed brine comprising Cl⁻, Br⁻, $Ca^{++}$ and $Mg^{++}$ countercurrently with a composite organic solvent in a first plurality of stages, thereby obtaining an extract and a depleted brine; and
    b) washing said extract with water to yield a product of an aqueous solution of $CaBr_2$ and a refluxed solvent, wherein said composite organic solvent comprises (1) an anionic extractant selected from the group consisting of primary, secondary, tertiary, and quaternary amines, and mixtures thereof having long, straight, or branched aliphatic chains (2) a cationic extractant selected from the group consisting of carboxylic acids, alkyl- or aryl-phosphoric acids, and alkyl- or aryl-sulphonic acids, and mixtures thereof having long, straight, or branched aliphatic chains and (3) a diluent-modifier selected from the group consisting of aromatic solvents having short aliphatic chains, nitro- or halo-aromatic solvents, and cycloaliphatic solvents.

2. The process according to claim 1, further comprising, prior to step b), a purification step for purifying said extract in a second plurality of stages to increase the Br:Cl ratio by contacting said extract with a part of said product, thereby obtaining a purified extract and a depleted reflux.

3. The process according to claim 2, wherein said product is concentrated to a concentration of about 52% by weight $CaBr_2$.

4. The process according to claim 1, wherein said feed brine has a Br:Cl weight ratio from about 1:20 to about 1:40, and said product has a Br:Cl weight ratio from about 10:1 to about 120:1.

5. The process according to claim 1, wherein said brine and said composite organic solvent flow in countercurrently through said first plurality of stages.

6. The process according to claim 1, wherein said brine flows successively through said first plurality of stages and said composite organic solvent flows countercurrently in each of said first plurality of stages.

7. The process according to claim 1, wherein said composite organic solvent flows successively through said first plurality of stages and is contacted in each of said first plurality of stages with a fresh stream of brine.

8. The process according to claim 1, wherein the diluent-modifier is selected from the group consisting of cyclohexane, ethers, substituted anilines, toluene, xylene, anisole, ethylbenzene, chlorobenzene and, nitrotoluene.

9. The process according to claim 1, wherein said composite organic solvent contains each of said anionic and cationic extractants in molar concentrations in the range of 0.4-0.9 M (moles per liter), and the difference in molar concentrations between said anionic and said cationic extractants is not more than about 0.15 M (moles per liter).

10. The process according to claim 1, wherein said composite organic solvent used to extract said feed brine is said refluxed solvent resulting from washing said extract of said step b).

11. The process according to claim 2, wherein said depleted reflux is added to said feed brine and fed with it to said extracting step.

12. The process according to claim 1, wherein said process is continuous.

13. The process according to claim 2, further comprising adding water in an intermediate point of said purification step.

14. The process according to claim 1, further comprising concentrating said product to a concentration of about 65 wt % or less.

15. The process according to claim 1, further comprising separating an entrained solvent from said depleted brine.

16. The process according to claim 1, wherein said feed brine is Dead Sea End Brine (EB).

* * * * *